United States Patent [19]

Kasner et al.

[11] Patent Number: 4,466,739
[45] Date of Patent: Aug. 21, 1984

[54] LASER BEAM ALIGNMENT SYSTEM

[76] Inventors: William H. Kasner, 11686 Althea Dr., Pittsburgh, Pa. 15235; Daniel J. Racki, 712 Union Cemetery Rd., Greensburg, Pa. 15601; Clark E. Swenson, 228 Scott Dr., Monroeville, Pa. 15146

[21] Appl. No.: 352,744

[22] Filed: Feb. 26, 1982

[51] Int. Cl.³ .............................................. B23K 26/02
[52] U.S. Cl. .................................... 356/138; 356/153; 350/299; 219/121 LV
[58] Field of Search ........................ 356/138, 153, 399; 350/486, 299; 219/121 LG, 121 LJ, 121 LN, 121 LU, 121 LV

[56] References Cited

U.S. PATENT DOCUMENTS

| | | | |
|---|---|---|---|
| 3,567,326 | 3/1971 | Smith-Vaniz | 356/153 |
| 3,710,798 | 1/1973 | Bredemeier | 219/121 LN |
| 4,289,378 | 9/1981 | Remy et al. | 219/121 LV |

FOREIGN PATENT DOCUMENTS 77989  6/1980  Japan ............................ 219/121 LU

*Primary Examiner*—R. A. Rosenberger
*Attorney, Agent, or Firm*—Edwin D. Grant; Stephen D. Hamel; Michael F. Esposito

[57] ABSTRACT

A plurality of pivotal reflectors direct a high-power laser beam onto a workpiece, and a rotatable reflector is movable to a position wherein it intercepts the beam and deflects a major portion thereof away from its normal path, the remainder of the beam passing to the pivotal reflectors through an aperture in the rotating reflector. A plurality of targets are movable to positions intercepting the path of light traveling to the pivotal reflectors, and a preliminary adjustment of the latter is made by use of a low-power laser beam reflected from the rotating reflector, after which the same targets are used to make a final adjustment of the pivotal reflectors with the portion of the high-power laser beam passed through the rotating reflector.

5 Claims, 2 Drawing Figures

LASER BEAM ALIGNMENT SYSTEM

BACKGROUND OF THE INVENTION

This invention was made under a contract with the U.S. Department of Energy and relates to an optical system for aligning a laser beam for a cutting operation or other use.

The use of a laser beam to cut the casing of a spent nuclear fuel element into segments as the initial step in recovering useable fuel therefrom provides several advantages not obtainable with a mechanical cutting apparatus. A laser beam can be directed through a window in an enclosure in which a spent fuel element is held to protect workers from radiation, and adjustments in the width and depth of cuts in different parts of the fuel element can be made without requiring a worker to enter the enclosure. However, in the use of a laser beam for a such purpose, it is necessary to provide means for adjusting the path traveled by the laser beam inside the enclosure, and this adjustment should of course be possible from a point outside the enclosure. Since a high-power laser beam used for cutting cannot be observed by conventional means, it has been proposed heretofore to use a low-power laser beam for adjusting reflectors that direct the cutting laser beam onto a workpiece. However, it would also be advantageous to be able to make a final adjustment of such beam directing reflectors with the cutting laser beam itself, since the latter can be refracted along a path different from that of a low-power laser beam used for the preliminary adjustment of the reflectors when the two beams pass through a window in a protective enclosure.

SUMMARY OF THE INVENTION

It is an object of this invention to provide an apparatus for accurately focusing a laser beam on a workpiece.

Another object of the invention is to provide a laser beam alignment system which makes an initial adjustment of the beam path by use of a low-power laser but which provides for the final adjustment of the beam path by use of the cutting beam itself.

An additional object of the invention is to provide an effective means for using only a small portion of a high-power laser beam for aligning the beam along a desired path, the remainder of the beam being shunted away from the path during the alignment procedure.

These objects are achieved by a preferred embodiment of the invention comprising a plurality of pivotal reflectors which direct a high-power laser beam onto a workpiece and a rotatable reflector movable to a position wherein it intercepts the beam and deflects a major portion thereof away from its normal path, the remainder of the beam passing to the pivotal reflectors through an aperture in the rotating reflector. A plurality of targets are movable to positions intercepting the path of light traveling to the pivotal reflectors, and a preliminary adjustment of the latter is made by use of a low-power laser beam reflected from the rotating reflector, after which the same targets are used to make a final adjustment of the pivotal reflectors with the portion of the high-power laser beam passed through the rotating reflector.

DETAILED DESCRIPTION OF A PREFERRED EMBODIMENT OF THE INVENTION

Figure 1:
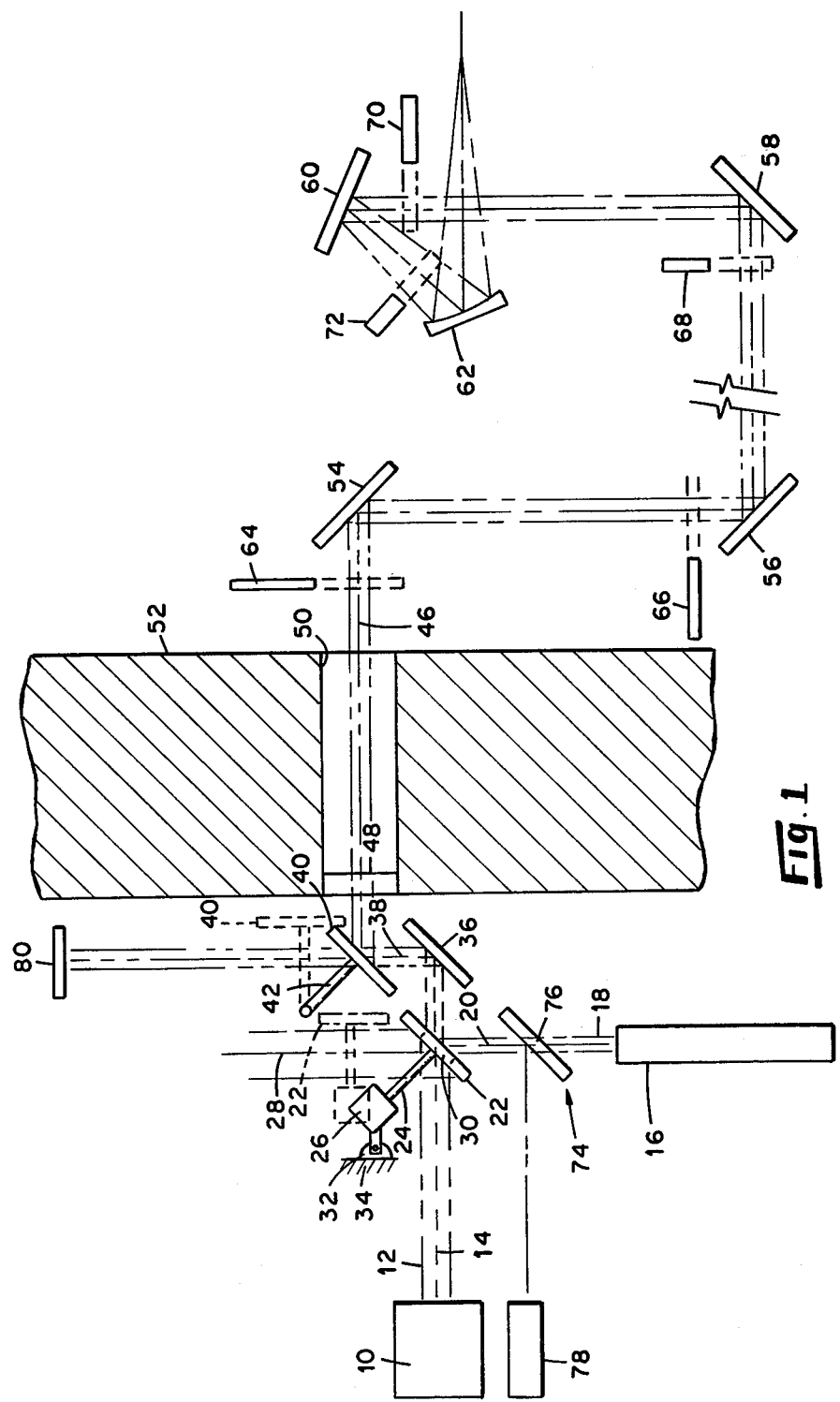
FIG. 1 is a schematic representation of an optical system constructed in accordance with principles of the invention.
Figure 2:
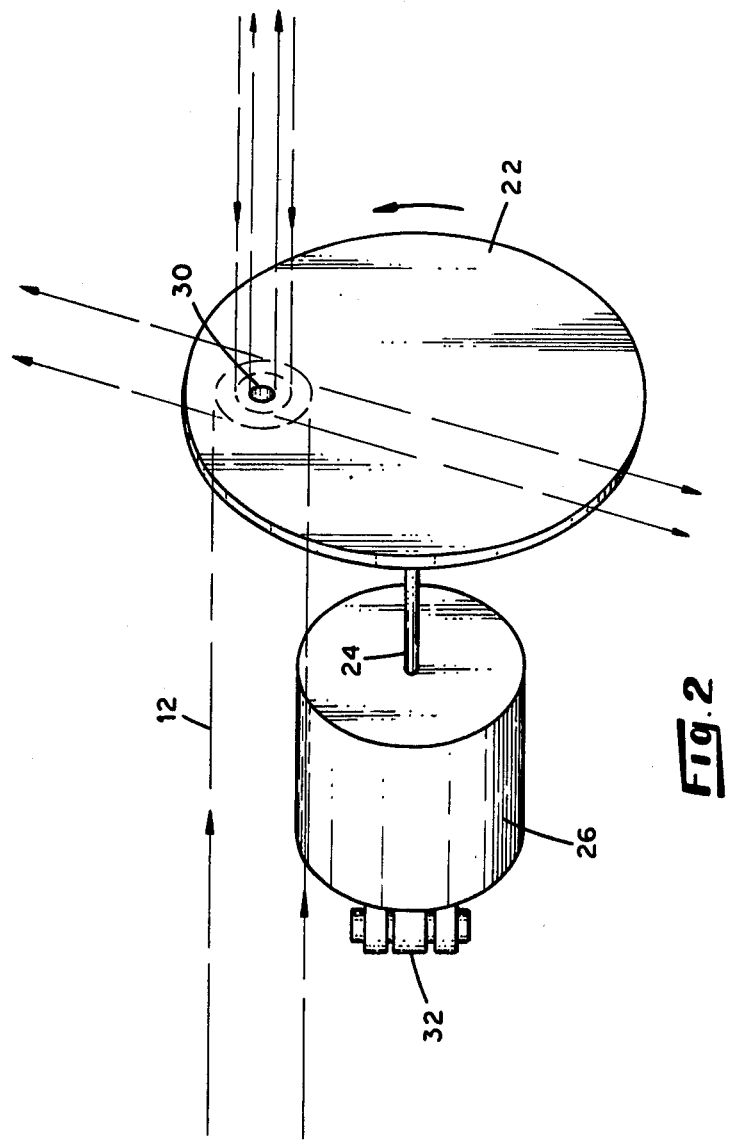
FIG. 2 is an enlarged view of some of the components of the system illustrated FIG. 1.

In FIG. 1 reference number 10 designates a high-power laser (such as a $CO_2$ laser) which projects a first beam 12 along a first path 14. A second low-power laser 16 (such as a helium-neon laser) projects a second beam 18 along a second path 20 perpendicular to and intersecting path 14, or the low-power laser 16 can be a part of the high-power laser 10 to thereby allow beam path 20 to be parallel to beam path 14. Disposed on path 14 at its point of intersection with path 20 is a first reflector generally designated 22. As illustrated in FIG. 2, reflector 22 is a disk attached at its center to the free end of the drive shaft 24 of a motor 26, the opposite side surfaces of the disk being polished and disposed perpendicular to the longitudinal axis of the drive shaft. During an alignment procedure using the system being described (which procedure will be described in detail hereinafter), motor 26 rotates reflector 22 and most of the radiant energy of beam 12 is diverted along a third path 28 transverse to path 14 while a small portion of the beam passes through an aperture 30 which extends through reflector 22 in spaced relation with its axis of rotation. A pivot means 32 attaches motor 26 to a support 34 for movement between (1) a first position wherein reflector 22 intercepts beam 12 and reflects a portion thereof along the aforesaid path 28 and (2) a second position wherein the reflector is moved out of the path of beam 12 as illustrated by broken lines FIG. 1, allowing the full high-power beam 12 to be transmitted to the workpiece.

Positioned on first path 14 on the side of reflector 22 remote from laser 10 is a second reflector 36. Light traveling on first path 14 is deflected by reflector 36 along a fourth path 38 transverse to the first path (as will be seen hereinafter, the beam that is directed along path 38 differs during the use of the disclosed alignment system).

A third reflector 40 is mounted on an arm 42 for swinging movement about an axis perpendicular to path 38. Thus reflector 40 is movable between (1) a first position wherein it deflects a light beam along a fifth path 46 which can be disposed at different angles relative to fourth path 38 and (2) a position wherein it is out of the path of a beam traveling along path 38. When directed along path 46 a beam passes through a window 48, impinges on a fourth reflector 54, and deflects therefrom to a series of additional reflectors respectively designated by reference numbers 56-62. These last-mentioned reflectors may vary in number and spatial arrangement according to the requirements of different cutting operations. However, the last reflector of the series is always a curved reflector which focuses the high-power laser beam 12 on a workpiece, and each reflector inside wall 52 is arranged to pivot about an axis perpendicular to path 14 like the reflectors 22, 36, 40 outside the wall. Target reflectors 64-72 are respectively positioned adjacent reflectors 54-62 and arranged to be moved from a position intercepting light traveling to the reflectors and a position out of the path of this light, the light intercepting position of each target reflector being illustrated in FIG. 1 by broken lines.

A viewing means used with the above-described beam alignment components comprises a reflector generally designated by reference number 74 and positioned on second path 20 between first path 14 and second laser 16. During one phase of operation of the alignment system, low-power beam 18 from laser 16 passes through an aperture 76 located in a viewing reflector 74. The exemplary viewing means also comprises a telescope 78 or other suitable means capable of detecting light emitted by lasers 10 and 16 and reflected from the reflecting surface of reflector 74 (i.e., the surface adjacent path 14) during the beam alignment procedure. Telescope 78 includes conventional means for observing visible light from laser 16 and an infrared detecting means for sensing beam 12 from 10.

The last element of the alignment system that must be described is a target 80 fixedly positioned beside wall 52 so as to intercept light reflected from reflector 36 when reflector 40 is moved to the position thereof illustrated by broken lines in FIG. 1. In the same drawing the distance between target 80 and reflector 36 is not shown to scale, this distance preferably being substantially equal to the length of the path traveled by beam 12 of high-power laser 10 between reflector 36 and the workpiece cut by the beam when the disclosed apparatus is in use. A centering point is provided on target 80 by conventional means such as crossed lines or a bull's eye, this centering point being used to align visible beam 18 of laser 16 during an initial step in the procedure that is followed for aligning beam 12 by use of the described apparatus.

OPERATION OF PREFERRED EMBODIMENT OF THE INVENTION

Before reflectors 54–62 are adjusted to direct beam 12 of high-power laser 10 along a desired path inside wall 52, the paths of beam 12 and beam 18 of low-power laser 16 are adjusted so that they are in coaxial or parallel relation along path 38 extending from reflector 36 to reflector 40. To accomplish this reflector 40 is temporarily swung to the position illustrated by broken lines in FIG. 1, reflector 22 is rotated by motor 26, and both lasers 10, 16 are turned on. Most of beam 12 is deflected from reflector 22 along path 28, but part of the beam passes through aperture 30 in the reflector and is deflected by reflector 36 to target 80. Since aperture 30 is spaced from the axis of rotation of reflector 22 (in FIG. 1, the aperture is illustrated at the center of reflector 22 only because it is located above the plane of the drawing), the area on target 80 impinged by the portion of beam 12 passing through reflector 22 is a solid circular shape. Beam 18 of laser 16 passes through aperture 76 in reflector 74 and is deflected from reflector 22 to reflector 36 and thence to target 80. Hence laser 16 can be adjusted to center its point of impingement on target 80 in the desired relation with the circle of impingement of beam 12 on the target. The points of impingement of beams 12, 18 on target 80 are detected by telescope 78, which as mentioned hereinbefore includes an infrared detecting means for sensing beam 12 and convention means for observing visible light from laser 16. A portion of each beam is reflected from target 80 back to reflectors 36, 22 and 74 in the order given here and thence to telescope 78, this reflected radiant energy spreading as it travels to reflector 74 and therefore impinging on the surface of the reflector surrounding aperture 76 therein.

Laser 10 is next turned off, reflector 40 is swung back in a position wherein it directs light reflected from reflector 36 through the window 48 in wall 52, and target reflector 64 is moved to a predetermined position (illustrated by broken lines in FIG. 1) in front of reflector 54. Beam 18 of low-power laser 16 is then used to make a preliminary adjustment of reflectors 54–62 to obtain a desired alignment of the path followed by a light beam inside wall 52 after it has passed through window 48. Reflector 40 can be adjusted to vary (1) the angle of path 46 relative to path 38 and thus (2) the point of impingement of beam 18 on target reflector 64. It should be noted that reflector 40 outside wall 52 and all of the reflectors 54–62 inside the wall can be arranged so that they pivot in any direction, but to simplify the description of the operation of the alignment system pivotal motion in one direction will be considered. The point of impingement of beam 18 on target reflector 64 can be observed by means of telescope 78 because part of the beam is reflected from the target reflector to the telescope via reflectors 40, 36, 22 and 74, in the order given, the reflected light spreading as it travels to reflector 74 and thus impinging upon the latter around aperture 76 therein.

After path 46 of beam 18 has been aligned as desired by adjustment of the angular position of reflector 40, target reflector 64 is moved out of the path of the beam, target reflector 66 is moved in front of reflector 56, and reflector 54 is then turned about its axis of rotation to cause the beam to impinge at a predetermined point on target reflector 66, this point of impingement again being observed by means of telescope 78. The same procedure is employed to adjust the path of beam 18 to the other reflectors and the workpiece to be cut.

A final adjustment of reflectors 54–62 is made with laser 16 turned off, laser 10 turned on, and reflector 22 rotating to deflect most of beam 12 along path 28. The portion of beam 12 which passes through aperture 30 in reflector 22 is impinged upon target reflectors 64–72 as they are successively placed in front of the reflectors as described in the preceding paragraph, and the portion of beam 12 reflected from the target reflectors 64–72 back to reflector 74 is sensed by the infrared detecting means associated with telescope 78.

It will be recognized that the disclosed laser beam alignment system can be modified without departing from the principles of its construction. For example, it is possible to replace the rotating reflector 22 with a conventional beam-splitting mirror, although the rotating reflector is a simple and effective means for dividing beam 12 of high-power laser 10 into two components during the laser beam alignment procedure. It is also possible to substitute a conventional beamsplitting mirror for apertured reflector 74.

What is claimed is:
1. A laser beam alignment system comprising:
    a first laser projecting a first high-power beam along a first path;
    a second laser projecting a second low-power beam along a second path disposed transverse to and intersecting said first path;
    a first reflector removably positionable on said first path and operative, when thereon, to (1) divert a portion of said first beam along a third path disposed transverse to said first path, (2) pass the re- mainder of said first beam along said first path, and (3) reflect said second beam along said first path;

a second reflector positioned on said first path for reflecting said first and second beams along a fourth path transverse to said first path;

a third reflector removably positionable on said fourth path and operative, when thereon, to reflect said first and second beams along a fifth path disposable at different angles relative to said fourth path;

a fourth reflector removably positionable on said fifth path and operative, when thereon, to reflect said first and second beams along a sixth path disposable at different angles relative to said fifth path;

a target reflector removably positionable on said fifth path between said third and fourth reflectors and operative, when thereon, to reflect a portion of each of said first and second beams back to said third reflector, second reflector, and first reflector in that order; and means for viewing portions of said first and second beams reflected from said target reflector back to said first reflector and thence along said second path.

2. The system of claim 1 wherein said first reflector is rotatable and has an aperture extending between side surfaces thereof in spaced relation with its axis of rotation, and including means for rotating said first reflector.

3. The system of claim 2 wherein said means for viewing portions of said first and second beams reflected from said target reflector back to said first reflector and along said second path comprises a viewing reflector positioned on said second path and having an aperture extending through the center thereof for passing said second beam therethrough, said backwardly reflected portions of said first and second beams being reflected by said viewing reflector in a direction transverse to said second path.

4. The system of claim 3 including infrared detecting means for sensing the backwardly reflected portion of said first beam which is reflected from said viewing reflector.

5. The system of claim 3 wherein said first laser is a carbon dioxide laser and said second laser is a helium-neon laser.

* * * * *